United States Patent [19]

Brown et al.

[11] Patent Number: 5,317,929
[45] Date of Patent: Jun. 7, 1994

[54] FIBER OPTIC FLEXURAL DISK ACCELEROMETER

[76] Inventors: David A. Brown, 534 Powell St., Salinas, Calif. 93907; Steven L. Garrett, P.O. Box 8716, Monterey, Calif. 93943; Thomas J. Hofler, P.O. Box 4479, Carmel, Calif. 93921

[21] Appl. No.: 651,856

[22] Filed: Feb. 7, 1991

[51] Int. Cl.[5] ............................................. G01P 15/08
[52] U.S. Cl. ................................. 73/517 R; 73/653; 73/657
[58] Field of Search ...................... 73/653, 657, 517 R; 250/227.19

[56] References Cited

U.S. PATENT DOCUMENTS

| | | | |
|---|---|---|---|
| 3,011,147 | 11/1961 | Geneslay | 73/517 R |
| 3,020,505 | 2/1962 | Bourns et al. | 73/517 R |
| 4,322,829 | 3/1982 | Davis, Jr. et al. | 73/653 |
| 4,363,114 | 12/1982 | Bicaro et al. | 73/657 |
| 4,376,390 | 3/1983 | Rines | 73/653 |
| 4,534,222 | 8/1985 | Finch et al. | 73/653 |
| 4,829,821 | 5/1989 | Carome | 73/516 LM |
| 4,893,930 | 1/1990 | Garrett et al. | 356/345 |
| 4,959,539 | 9/1990 | Hofler et al. | 250/227.19 |
| 4,972,713 | 11/1990 | Iwata | 73/517 R |

OTHER PUBLICATIONS

Endevco General Catalog; Endevco, San Juan Capistrano, Calif.; 1986;.
D. A. Brown, T. Hofler, and L. L. Garrett; "Fiber Optic Flexural Disk Microphone" *Proceedings of SPIE,* vol. 985, 607 Sep. 1988, pp. 172-182; Society of Photo-Optical Instrumentation Engineers; Bellingham, Wash.
D. A. Brown, T. Hofler, and S. L. Garrett; "High-Sensitivity, Fiber Optic, Flexural Disk Hydrophone with Reduced Acceleration Response"; *Fiber and Integrated Optics;* vol. 8, pp. 169-191, 1989.

*Primary Examiner*—Robert Raevis
*Assistant Examiner*—Michael Brock
*Attorney, Agent, or Firm*—Stephen J. Church; Melvin J. Sliwka; John L. Forrest, Jr.

[57] ABSTRACT

An accelerometer or seismometer has a pair of flat spirals of optical fiber and has one or more elastic disks bearing a mass and supported for flexure. Each spiral is fixedly attached to a corresponding disk side so that disk flexure lengthens a spiral on one disk side and shortens a spiral on an oppositely facing disk side, the spirals being connected as legs of a fiber optic interferometer so that the interferometer provides an output corresponding to the flexure. A pair of the disks may be mounted oppositely of a sealed body with a pair of the spirals arranged to minimize the effect of pressure changes on the sensor, and a pair of the spirals may be mounted oppositely of a thermally conducting disk to minimize temperature differences between the spirals. The mass may be centrally mounted on a disk with the disk peripherally supported, or the mass may be distributed around the disk periphery with the disk centrally supported for isolation from mounting strain. Several of the disks may be coaxially mounted to provide increased sensitivity.

5 Claims, 3 Drawing Sheets

FIBER OPTIC FLEXURAL DISK ACCELEROMETER

BACKGROUND OF THE INVENTION

1. Field of the Invention

This invention relates to measuring acceleration and vibration using optical measurement by light interference.

2. Description of the Prior Art

The flexure or strain of an elastic disk is a well-known basis for measurements including acceleration and pressure, acceleration typically being measured by such flexure resulting from momentum forces acting on such a disk in a direction along its axis. The amount of flexure may be determined interferometrically, mechanically, piezoelectrically, or by changes in capacitance or resistance of elements associated with the disk. However, all strain measuring devices have various deficiencies such as limited sensitivity, high cost, limited maximum deflection, and errors due to operating conditions. Some errors due to operating conditions may be fundamental, such as the flexure of a disk due to acceleration being indistinguishable from flexure due to pressure differential. Other operating condition errors are caused by changes in dimensions, modulus of elasticity, index of refraction, and the like caused by temperature and pressure.

Interferometric measurements of strain can provide great resolution and, when carried out with an optical fiber, provide a simple and rugged sensor which requires low power, is immune to electromagnetic interference, and is adapted to remote sensing and to high data rates. Although optical fiber interferometric measurements of acceleration and pressure may be carried out directly with fibers of suitable construction, optical fibers themselves are relatively insensitive per unit length when used directly and are subject to errors due to ambient pressure, tension from acceleration, and the like. Interferometers having a single optical fiber sensing leg are particularly subject to error due to temperature caused variations of the leg length. It is evident that increasing leg length to provide greater sensitivity may proportionately increase errors due to operating conditions.

It is known to minimize operating condition errors by a "push-pull" arrangement of a pair of interferometer optical fiber legs such that a change in a measured variable shortens one leg and lengthens the other leg while both legs change length together with undesired variations due to temperature, pressure, or acceleration. However to be effective, interferometric rejection of such common mode errors requires that both legs be subject to exactly the same conditions.

It is also known to increase the sensitivity of fiber optic acceleration and pressure measurements by using the fibers indirectly, as by arranging an optical fiber wound element for strain due to the displacement or deformation of a primary force measuring element. For example, U.S. Pat. No. 4,893,930 discloses a mass supported between pairs of resilient, cylindrical mandrels each wound with an optical fiber which is one leg of an interferometer. In this arrangement, displacement of the mass causes lateral expansion of one mandrel of a pair and contraction of the other thereof so that the fibers of the pair function in the above-described push-pull manner. Such fiber optic arrangements are effective, but may be somewhat limited in sensitivity and have the push-pull optical fiber legs separated spatially and thermally.

High sensitivity and minimal spatial and thermal separation of push-pull fiber optic legs are provided in hydrophones disclosed in U.S. Pat. No. 4,959,539. In these hydrophones, each side of an elastic and circumferentially supported disk is wound with a flat spiral of optical fiber fixedly attached to the disk side. As a result of this construction, flexure of the disk shortens such a spiral on one side of the disk and lengthens such a spiral on an oppositely facing side. Such a disk may be mounted on a body so that an acoustic pressure differential to be measured exists across the disk, the spirals then being connected for push-pull operation as two legs of a fiber optic interferometer to provide an output corresponding to the flexure while substantially canceling errors due to pressure and temperature effects common to the legs. In one such hydrophone, a pair of the circumferentially supported disks and associated optical fiber spirals are mounted on opposite ends of such a body with the outer spirals connected as one interferometer leg and the inner spirals as another leg so that differences in the lengths of the legs due to acceleration induced flexure of the disks are canceled. This double disk arrangement also has twice the sensitivity of the single disk arrangement. Even greater sensitivity would be desirable if the cancellation of common mode errors is not decreased.

SUMMARY OF THE INVENTION

An object of the present invention is to provide, for acceleration and other movement related parameters, a sensor which has great sensitivity and yet has minimal errors due to temperature and to acoustic and static pressure.

Another object is to provide such a sensor which utilizes a fiber optic interferometer having a pair of legs in a push-pull arrangement to provide sensitivity and minimize errors while providing convenient connection to remote interferometric sources and detectors.

Still another object is to provide such a sensor which is rugged, easily constructed, and fully effective for measurements under a variety of conditions.

These and other objects and advantages are provided by an accelerometer, or other sensor of the present invention, wherein an elastic disk and a predetermined mass are supported by a body for flexure of the disk due to acceleration, shock, vibration and displacement of the body in a direction axially of the disk. Such a disk, or a plurality of such disks, are wound with a pair of flat spirals of optical fiber, each spiral being fixedly attached to a corresponding disk side so that disk flexure lengthens a spiral on one disk side and shortens a spiral on another disk side. In the present invention, such spirals on oppositely facing disk sides are connected as opposite legs of a fiber optical interferometer so that the interferometer provides an output corresponding to the amplitude of the flexure. A pair of the disks and their associated spirals may be mounted oppositely of a sealed body extending between the disks so that connection of oppositely facing spirals as interferometer legs cancels differences in the lengths of the legs due to fluid pressure variations. A push-pull pair of the spirals may be disposed oppositely of a thermally conducting disk to minimize temperature differences between the push-pull spiral pair. An accelerometer or other sensor of the present invention may be constructed with a disk having the mass centrally disposed and the disk supported peripherally or may be constructed with a centrally supported disk having the mass distributed around the disk periphery, the latter construction being advantageous in devices of the present invention which are isolated from mounting stress or which have a plurality of coaxially mounted disks for increased sensitivity.

BRIEF DESCRIPTION OF THE DRAWINGS

The features of the present invention will be apparent from the following detailed description of the invention when considered in conjunction with the accompanying drawings wherein.

DETAILED DESCRIPTION

FIGS. 1-4 Embodiment

Referring more particularly to the drawings, FIGS. 1-4 show a sensor which is an embodiment of the present invention for measurement of parameters such as acceleration, shock, vibration, and displacement related to physical movement as distinguished from a sensor, such as a microphone or a hydrophone, for sensing pressure or acoustic vibrations in a fluid. This embodiment is easily adapted for sensing acceleration so that it may be referred to herein as an "accelerometer", a device subject to and measuring a vibration or movement having a frequency less than the resonant frequency of certain elements of the device subsequently described in detail. However, the resonant frequency of oscillation of these elements may be selected, in a manner apparent to one skilled in the art, so that a sensor of the present invention functions as a seismometer, a device in which vibration or movement to be sensed has a frequency greater than the resonant frequency of oscillation of these elements.

Figure 1:
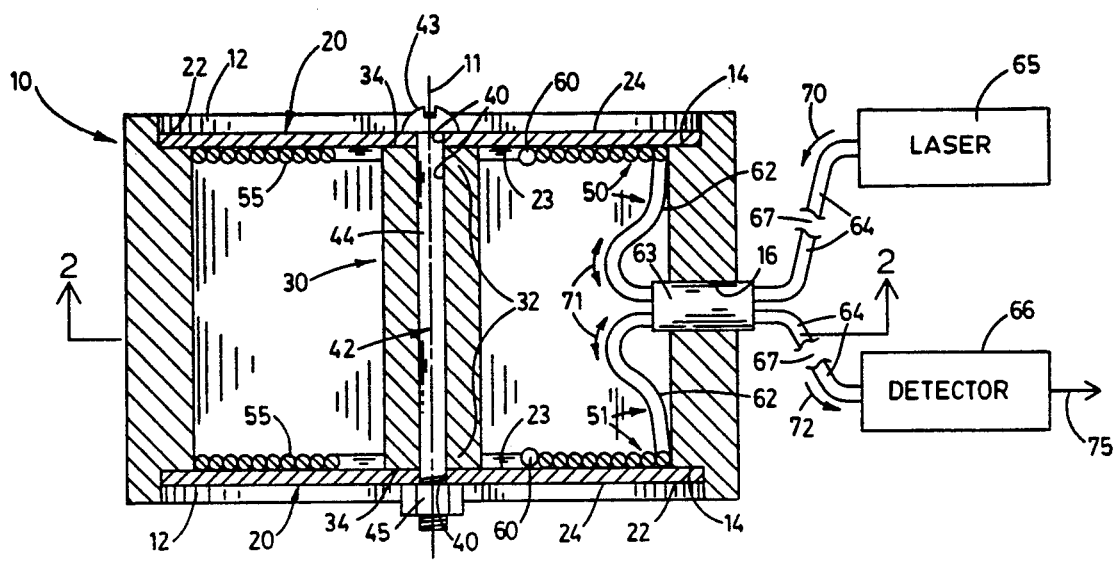
FIG. 1 is an axial section of a fiber optic, flexural disk sensor which is a first embodiment of the present invention for measurement of acceleration and other parameters of physical movement, the sensor being depicted with schematically represented interferometer elements.
Figure 2:
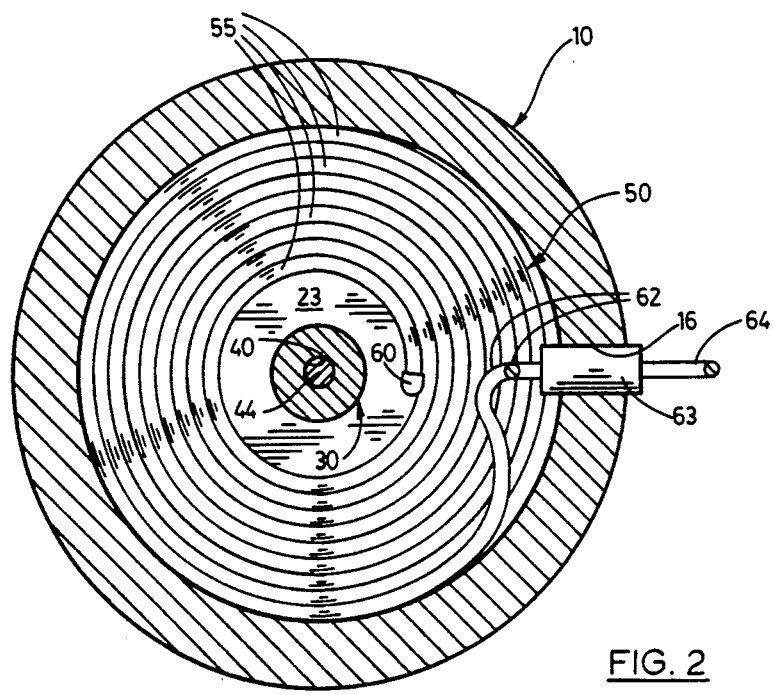
FIG. 2 is a section of the sensor of FIG. 1 taken from the position of line 2—2 thereof.

The sensor has a rigid cylindrical body 10 best shown in FIGS. 1 and 2. Body 10 has an axis 11 and axially opposite open end regions 12. Each region has a counterbore providing an annular, planar surface 14 normal to axis 11 and facing outwardly of the body. Body 10 has a bore 16 disposed axially centrally thereof and extending radially through the body, this bore being fluid sealed as subsequently described.

The sensor has a pair of planar disks 20 disposed normally to axis 11. Each disk has a periphery 22 individually received in the counterbores of regions 12 so that the disks are supported peripherally by body 10 with the disks disposed in coaxial and axially spaced relation. Each disk has an inward side 23 facing axially centrally of body 10 and facing the inward side of the other disk. Each disk has an outward side 24 axially opposite its inward side 23 and facing away from the other disk. Each inward side 23 is flatly and detachably engaged in fluid sealed relation with the corresponding body surface 14. This relation is provided by elements subsequently described which draw each disk 20 against its surface 14. However, this relation may be promoted in any suitable manner, not shown, as by a releasable sealant, an adhesive, or an annular seal between the disk and the surface. It is evident that the sensor is immersible in a fluid such as air or water, not specifically depicted, with outward disk sides 24 in contact with the fluid and the interior of the body between inward disk sides 23 isolated from the fluid.

A sensor embodying the present invention may also be constructed with a disk, which corresponds to one of the disks 20, unitarily constructed by machining or molding with a body or portions thereof corresponding to body 10.

Figure 3:
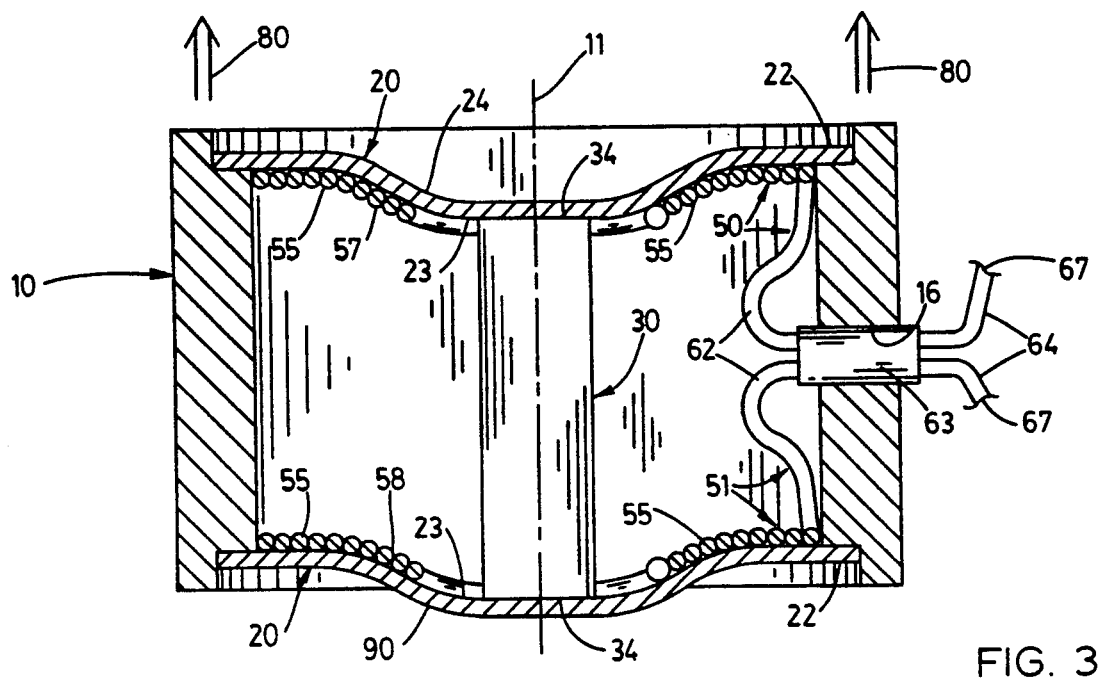
FIG. 3 is a schematic axial section of the sensor of FIG. 1 depicting deflection of disks thereof in response to acceleration, the deflection being exaggerated for illustrative purposes.
Figure 4:
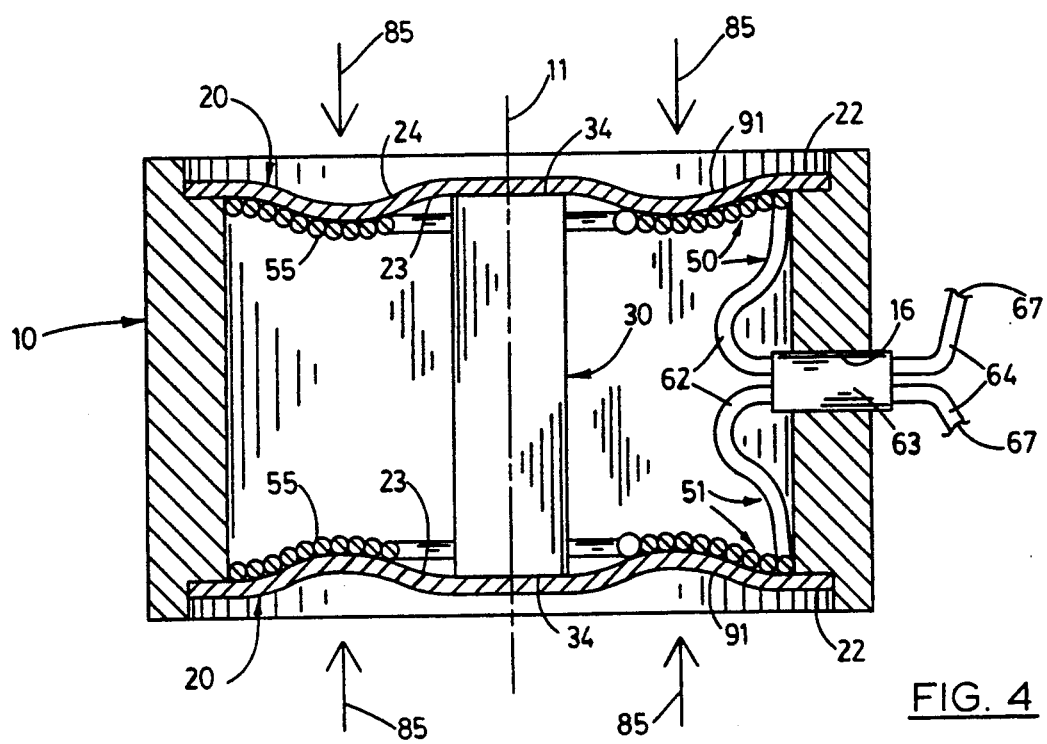
FIG. 4 is a schematic axial section of the sensor of FIG. 1 depicting deflection of disks thereof in response to pressure, the deflection being exaggerated for illustrative purposes.

Disks 20 are constructed of any suitable elastic and resilient material so that the disks are axially flexible. As a result, the disks are mounted on body 10 with the disks supported for deflection in a direction axially of the disks and normal to their sides 23 and 24 as shown in FIGS. 3 and 4.

The FIGS. 1-4 embodiment sensor has a mass 30 extending between disks 20 and along axis 11 so that this mass is disposed centrally of the disks. Mass 30 is cylindrical and has a pair of axially opposite end portions 32 each bearing a planar surface 34 normal to axis 11 and spaced axially substantially the same distance as body surfaces 14. Surfaces 34 individually, flatly, and detachably engage inward sides 23 of disks 20.

Mass 30 and each disk 20 have a central bore 40 aligned with axis 11. Any suitable fastener, such as a conventional screw assembly 42, is utilized to releasably connect disks 20 to body regions 12 and to mass 30 so that the disks may be separated from body 10 and mass 30 to replace this mass with any one of a plurality of similar masses, not shown but having opposite end portions corresponding to portions 32. Assembly 42 has a unitary head 43 and screwthreaded shank 44 and has a nut 45 screwthreadably engageable with the shank, the shank being extended through aligned bores 40 with head 43 and nut 45 individually bearing against outward disk sides 24 so that appropriate rotation of nut 45 on shank 44 results in mass 30 being fixedly and directly mounted on and resiliently and elastically supported by disks 20 and results in the disks being drawn toward each other and body 10 and into the above mentioned fluid sealed relation with the body.

A sensor embodying the principles of the present invention may also be constructed with a disk similar to disk 20 having its periphery clamped in any suitable manner to a body similar to body 10. The disk periphery may also be simply supported. A sensor of the present invention may also be constructed by connecting elements corresponding to body 10, disks 20, and mass 30 in some other suitable manner which may utilize adhesive or by unitary construction when it is not desired to separate the elements.

The FIGS. 1–4 embodiment sensor has an optical fiber 50, which is depicted as being associated with the upper one of the disks 20 shown in FIG. 1, and has an optical fiber 51, which is depicted as being associated with the lower one of these disks. Each fiber 50 and 51 is wound with a flat spiral or spiral portion 55 which is fixedly connected, as by any suitable adhesive, along the length of the spiral to the inward side 23 of the disk with the spiral being wound on and substantially concentrically with this disk side. The spirals 55 are fixedly connected or bonded in any suitable manner to the corresponding disk side 23 so that each spiral undergoes the same strain as that side of the disk. A spiral 55 on a disk side which flexes so as to be generally convex, as indicated in FIG. 3 by numeral 57, thus increases in length. However, spiral 55 on a side which flexes so as to be generally concave, as indicated by numeral 58 decreases in length. Preferably, spirals 55 are of substantially equal length and are wound with adjacent turns touching. For illustrative convenience, the diameter of the fiber forming spirals 55 depicted as relatively larger in relation to the dimensions of disks 20 than is typically the case.

A sensor having the depicted configuration of disks 20 and spirals 55 is simple to construct and provides relatively high sensitivity and substantial freedom from common mode errors. However, the present invention includes variations such as the use of a flexural element which is not circular or which is axially bowed when there is no pressure differential. Other such variations include an optical fiber spiral conforming to such a noncircular or bowed element, the use of a single optical fiber spiral, and the use of such a spiral which has spaced turns, turns alternating with turns of another spiral, or multiple optical fiber spirals disposed in layers.

Each spiral 55 terminates at its inner turn in a cleaved and thus reflective end which is depicted in FIGS. 1 and 2 as being covered by a cap 60 since the reflectivity of the cleaved end may be adversely affected by the adhesive used to affix the spiral to disk 20. Each fiber 50 and 51 has an extension 62 from the outer turn of the corresponding spiral 55 to one end of a 3dB coupler 63. This coupler is conveniently received in fluid sealed relation in bore 16. As shown in FIG. 1, a pair of leads 64 of optical fiber extend from the other end of the coupler individually to a laser 65 and to a detector 66. As conventionally indicated by breaks 67, leads 64 may be relatively long so that laser 65 and detector 66 may be remote from the balance of a sensor of the present invention. Spirals 55 are thus connected as legs of a Michelson interferometer which is preferred in the practice of the present invention because of its sensitivity and need for only one connection to each spiral 55 to other forms of interferometer. However, the present invention may be practiced with optical fiber spirals, which are similar to spirals 55, utilized in a Mach-Zehnder, Sagnac, Fabry-Perot or other interferometer.

Such interferometric use of optical fibers is well-known and will be only briefly described. Light indicated by arrow 70 is transmitted from laser 65 to coupler 63. As indicated by double headed arrows 71, this light is transmitted via the coupler to the spiral fiber ends with caps 60 and is reflected back to the coupler and combined thereat to generate light having variations in intensity due to interference fringes corresponding to variations of the relative length of the spiral of fiber 50 and the spiral of fiber 51 caused by axial flexing of disks 20 as indicated in FIGS. 3 and 4 by numerals 57 and 58. The varying light due to these fringes is transmitted to detector 66 as indicated by arrow 72. Detector 66 converts such light variations to corresponding variations in an electrical signal 75 for any suitable display, demodulation, or other use.

Operation

The operation of a sensor embodying the present invention will now be briefly described, initially with reference to FIGS. 3 and 4 wherein the construction of the sensor is, for simplicity in exposition, somewhat simplified from the construction shown in FIGS. 1 and 2. In a sensor which is constructed as an accelerometer and undergoes acceleration in a direction along axis 11, as in an upward direction in FIG. 3 indicated by arrows 80, or which is constructed as a seismometer and has body 10 displaced in this direction, momentum of mass 30 induces axial deflection of the centers of both disks 20 in the opposite direction. The term "momentum" is used in the present application to describe the tendency of a mass such as mass 30 to continue in motion or to remain at rest. Since the spirals 55 of fibers 50 and 51 are disposed on the axially oppositely facing inward sides 23 of these disks, such acceleration results in fiber 50 lengthening as the corresponding disk side becomes convex as indicated by numeral 57 and results in fiber 51 shortening as the corresponding disk side becomes concave as indicated by numeral 58. The interferometer legs formed by fibers 50 and 51 thus change in length in opposite directions so that the interferometer formed by these fibers, coupler 63, laser 65, and detector 66 sums the interferometric effects of such acceleration and of such displacement. However, when a sensor of the present invention constructed either as an accelerometer or as a seismometer is subjected to a pressure variation in a fluid in which the sensor is immersed, such as an increasing pressure variation indicated by arrows 85 in FIG. 4, disks 20 are deflected in opposite directions along axis 11 and spirals 55 and thus fibers 50 and 51 both change in length in the same direction to substantially cancel interferometric effects of the pressure variation.

It is evident from a comparison of the deflected shapes of disks 20 in FIGS. 3 and 4 that, because of the flat engagement of surfaces 34 of mass 30 with disk inward sides 23 and because the mass does not move axially due to the balanced pressure forces represented by arrows 85, the disks are relatively stiffer in relation to such pressure forces than to forces resulting from acceleration or displacement indicated by arrows 80. Forces 80 thus deflect the entire disk a relatively large distance axially into a dome-like configuration indicated in FIG. 3 by numeral 90 while forces 85 only deflect the region of the disk between mass 30 and the disk periphery 22 a relatively small amount axially into a toroidal zone-like configuration indicated in FIG. 4 by numeral 91. As a result, the lengths of spirals 55 are relatively less affected by variations in the pressure of a fluid in which the sensor of FIGS. 1–4 is immersed than by acceleration and displacement related forces to be measured by the sensor.

The sensor of FIGS. 1–4 is, because of its operation as described in the two preceding paragraphs, relatively sensitive in measuring the parameters of acceleration and displacement and is substantially insensitive to errors caused by pressure variations in a fluid in which the sensor is immersed.

In a sensor of the present invention an elastic disk, such as one of the disks 20, is deflected as described above by the momentum of a mass, such as mass 30, supported by the disk. When such deflection occurs, the elasticity of the disk tends to restore the disk to its undeflected configuration so that the disk and mass are a mass-spring system having the above mentioned resonant frequency of oscillation. This frequency is predetermined by the relative values of the elasticity and the mass and is selectable by one skilled in the art by changing the mass and by changing the elastic properties of the disk as determined by its dimensions, material, and mode of support. These elastic properties also include the stiffness of the disk as determined by the diameter of the mass surface 34 engaged with the disk.

As before mentioned, whether a sensor of the present invention is effective as an accelerometer or seismometer depends on the resonant frequency of the disk-mass system relative to the frequency of acceleration or displacement vibrations to which the sensor is subjected. The sensor depicted in FIGS. 1 and 2 is highly advantageous in that this resonant frequency is readily selectable by interchanging one mass 30 with another such mass by virtue of the detachable construction of body 10, disks 20, and mass 30 and their releasable connection by assembly 42. Desired resonant frequencies may be predetermined by constructing the mass of materials having different densities, by varying the volume of the mass, and by varying the stiffness of disks 20 by changing their thickness or the area of surface 34.

Variations

The above-described sensor has an elastic disk 20 arranged for peripheral support by body 10 and arranged to centrally support a mass 30. Three variations in the construction of a sensor embodying the present invention and similarly arranged will now be described, the numerals of FIGS. 1-4 being used for elements similar to the elements of these figures. In these variations the arrangements for connecting a disk, the body, and the mass are not specifically depicted since any suitable arrangements, including those described above, may be utilized.

Figure 5:
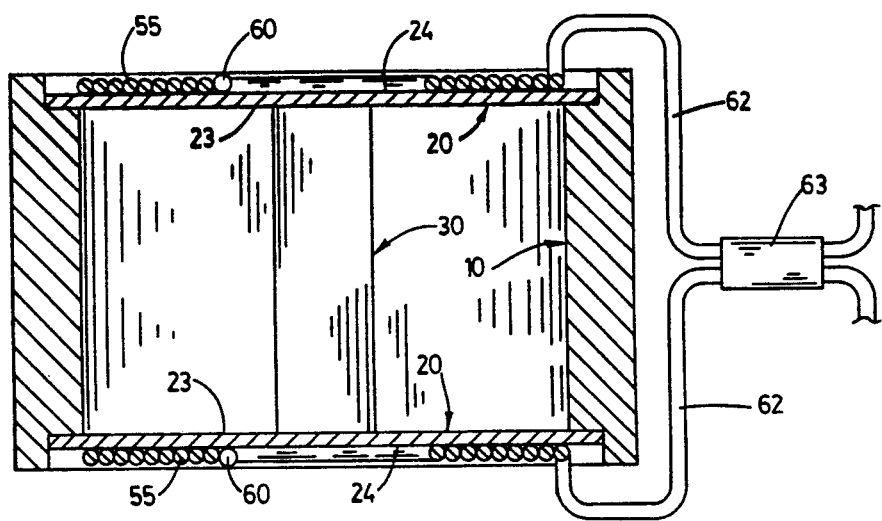
FIG. 5 is a schematic axial section of a fiber optic, flexural disk sensor which is a variation of the first embodiment of the present invention.

One such sensor variation depicted in FIG. 5 has the above described operating advantage of being substantially insensitive to errors caused by pressure variations in a fluid in which the sensor is immersed. The FIG. 5 variation is characterized by having a pair of the spirals 55 fixed on the outwardly facing sides 24 of a pair of disks 20 with the spirals connected as opposite interferometer legs to coupler 63. The FIG. 5 variation is simple to construct and, since access to the sensor interior is not required, disks 20 and body 10 may be of unitary or other prefabricated construction. However in the FIG. 5 variation, the spirals are not isolated from environmental effects and mechanical damage as in the structure shown in FIGS. 1-4.

Figure 6:
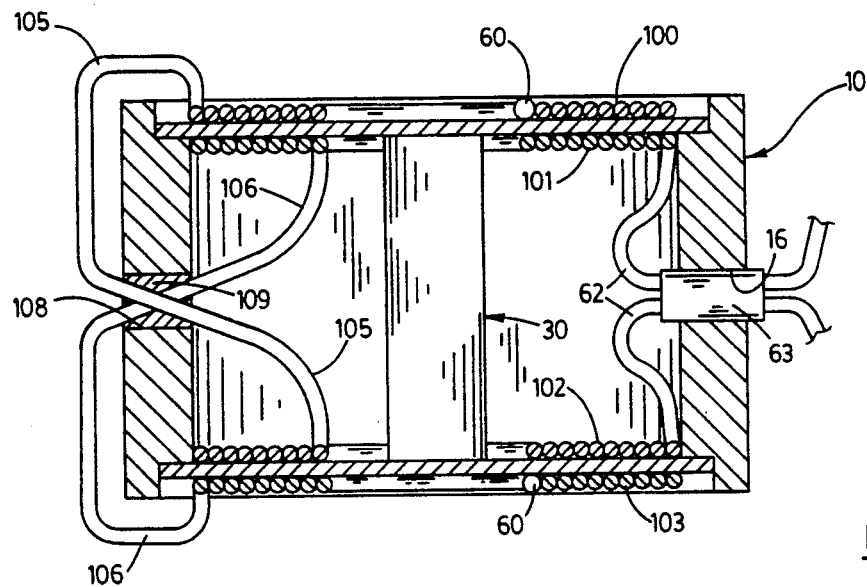
FIG. 6 is a schematic axial section of a fiber optic, flexural disk sensor which is another variation of the first embodiment of the present invention.

Another such variation depicted in FIG. 6 has the above described operating advantage and provides greater sensitivity by utilizing four optical fiber spirals 100-103 which are each similar to one of the spirals 55. Spirals 100-103 are individually fixed on the inner sides 23 and on the outer sides 24 of a pair of the disks 20. In the FIG. 6 variation, spiral 100 is on the outward side of one disk 20 and spiral 102 is on the inward side of the other disk, this inward side facing in the same direction as the side bearing spiral 100. Spirals 100 and 102 are connected in series as one interferometer leg by a length 105 of optical fiber. Similarly, spiral 101, which is on the inward side of the disk bearing spiral 100, and spiral 103, which is on the outward disk side bearing spiral 102 and facing in the same direction as the side bearing spiral 101, are connected in series as another interferometer leg by a length 106 of optical fiber. The FIG. 6 variation is conveniently constructed with coupler 63 received in bore 16 and connected to spirals 101 and 102 by extensions 62 and with lengths 105 and 106 of optical fiber extending from these spirals through a bore 108, which extends radially through body 10 oppositely of bore 16, to spirals 100 and 103 which have terminations provided with the caps 60. Bore 108 is preferably fluid sealed by a plug 109 received therein and surrounding lengths 105 and 106.

Figure 7:
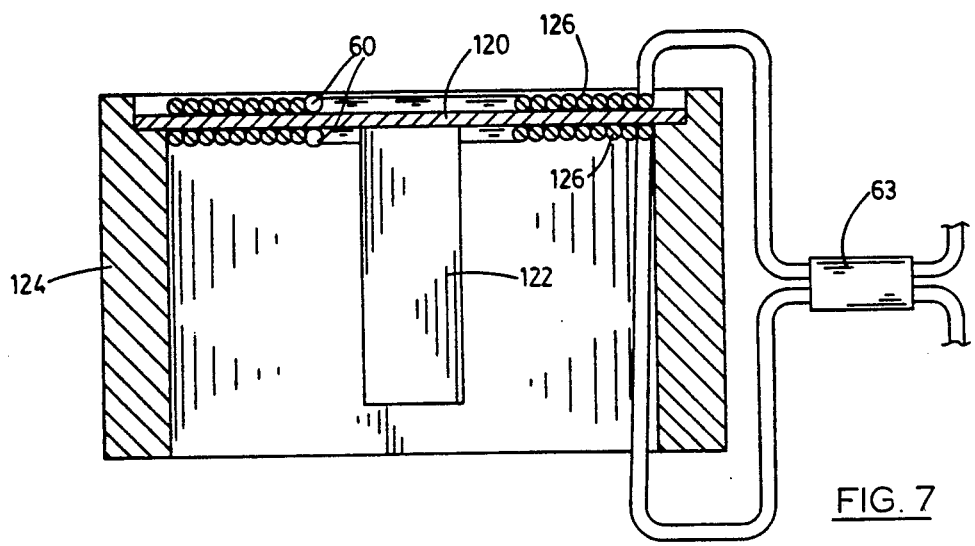
FIG. 7 is a schematic axial section of a fiber optic, flexural disk sensor which is a further variation of the first embodiment of the present invention.

A further such variation depicted in FIG. 7 has a single disk 120 which corresponds to a disk 20 and which bears centrally a mass 122 corresponding to mass 30. Disk 120 is supported at one axial end of a cylindrical body 124 in the same manner as a disk 20 is supported on body 10. Body 124 may be open at its other axial end to equalize fluid pressure on opposite sides of disk 120. In this variation, a pair of spirals 126 corresponding to spirals 55 are individually fixed to the opposite sides of the disk and are connected as opposite interferometer legs by extensions 62 to coupler 63. Such a sensor, which does not inherently protect against the environment, may be enclosed in any suitable case, not shown.

The FIG. 6 variation and the FIG. 7 variation minimize common mode temperature effects by having a pair of the spirals 100-103 or 126, which are in opposite interferometer legs, mounted on the same disk 20 or 120 so that the pair of spirals are at substantially the same temperature, particularly when the disk is constructed of material such as aluminum which is a relatively good conductor of heat.

Obviously many modifications and variations of the present invention are possible in light of the above teachings. It is, therefore, to be understood that the present invention may be practiced within the scope of the following claims other than as specifically described.

What is claimed is:

1. A sensor for a parameter of physical movement, the sensor being immersible in a fluid and comprising;
   a pair of elastic elements, each of said elastic elements having opposite sides;
   a mass supported by said elements;
   body means for supporting said elements for deflection of said elements along an axis generally normal to said sides so that momentum of said mass induces said deflection; said body means supporting said pair of said elements in spaced relation with one of said sides of each of said elements facing oppositely of the element from the other of said elements for contact with said fluid so that a change in pressure of said fluid urges said elements to deflect in opposite directions along said axis and so that acceleration and displacement of the sensor along said axis urge said elements to deflect in the same direction along said axis; and
   a pair of optical fibers connectable as legs of an interferometer and having individual spiral portions, said spiral portions being fixedly and individually connected to said elements at one of said sides thereof, each of said spiral portions being wound on the corresponding one of said sides so that said deflection of said elements induces in the fiber a variation in length corresponding to said deflection for interferometric measurement of said variation in length; and said spiral portions of pair of fibers being disposed on oppositely facing sides of said elements so that said change in pressure urges each of said fibers to change in length in the same direction, and so that said acceleration and displacement urge said fibers to change in length in opposite directions.

2. The sensor of claim 1 wherein;
each of said elements is a disk, and said spiral portion corresponding to the disk is substantially concentric with the disk;
said mass is mounted on said elements; and
said body means supports said elements for such deflection in a direction axially of the elements.

3. A sensor for a parameter of physical movement related to acceleration and to displacement of the sensor, the sensor being immersible in a fluid and comprising;
 a pair of optical fibers having a pair of generally planar spirals wound individually in the fibers;
 a pair of axially flexible elastic disks, each disk having a pair of axially opposite sides, one side of each of said disks having one spiral of said pair thereof disposed concentrically on the disk and fixedly attached to said side along the length of said spiral so that the length of the spiral increases when the disk flexes convexly at said side and decreases when the disk flexes concavely at said side;
 a body supporting said disks peripherally in fluid pressure sealed relation to the body with said disks disposed in coaxial and axially spaced relation so that the sensor
  has a pair of outward said sides corresponding individually to each of said disks, facing away from the other of said disks, and subjected to said fluid so that a pressure variation in said fluid causes axial flexing of disks in opposite directions, and
  has a pair of inward said sides corresponding individually to each of said disks and facing toward the other of said disks,
 one spiral of said pair thereof being disposed on one of said inward sides and the other spiral of said pair thereof being disposed on the other of said inward sides;
 a mass extending between said disks and having a pair of opposite portions spaced axially thereof, said opposite portions being individually connected to said disks so that momentum of said mass causes axial flexing of said disks in the same direction during said acceleration and displacement; and
 interferometer means having said fibers connected as a pair of legs thereof for providing an output signal corresponding to differences in length of the fibers due to said flexing of the disks so that said pressure variation results in said legs changing in length in the same direction to substantially cancel interferometric effects of said pressure variation and so that said acceleration and said displacement result in said legs changing in length in opposite directions to sum interferometric effects of said acceleration and said displacement.

4. A sensor for a parameter of physical movement related to acceleration and to displacement of the sensor, the sensor being immersible in a fluid and comprising;
 a pair of optical fibers having a pair of generally planar spirals wound individually in the fibers;
 a pair of axially flexible elastic disks, each disk having a pair of axially opposite sides, one side of each of said disks having one spiral of said pair thereof disposed concentrically on the disk and fixedly attached to said side along the length of said spiral so that the length of the spiral increases when the disk flexes convexly at said side and decreases when the disk flexes concavely at said side;
 a body supporting said disks peripherally in fluid pressure sealed relation to the body with said disks disposed in coaxial and axially spaced relation so that the sensor
  has a pair of outward said sides corresponding individually to each of said disks, facing away from the other of said disks, and subjected to said fluid so that a pressure variation in said fluid causes axial flexing of disks in opposite directions, and
  has a pair of inward said sides corresponding individually to each of said disks and facing toward the other of said disks;
 a mass extending between said disks and having a pair of opposite portions spaced axially thereof, said opposite portions being individually connected to said disks so that momentum of said mass causes axial flexing of said disks in the same direction during said acceleration and displacement, said mass being one mass of a plurality of different masses each having a pair of said opposite portions each opposite portion of said pair thereof of each of said masses being detachably engagable with the inward side of the disk corresponding to the opposite portion;
 a first region of said body peripherally and detachably engagable in fluid sealed relation with one of said inward sides;
 a second region of said body peripherally and detachably engagable in fluid sealed relation with the other of said inward sides;
 means, which releasably connect each of said disks to the corresponding one of said portions of said masses and which releasably maintain said first region and said second region in said pressure sealed relation, for separating said disks from said mass and from said body to replace said one mass with another mass of said plurality thereof; and
 interferometer means having said fibers connected as a pair of legs thereof for providing an output signal corresponding to differences in length of the fibers due to said flexing of the disks so that said pressure variation results in said legs changing in length in the same direction to substantially cancel interferometric effects of said pressure variation and so that said acceleration and said displacement result in said legs changing in length in opposite directions to sum interferometric effects of said acceleration and said displacement.

5. A sensor for a parameter of physical movement related to acceleration and to displacement of the sensor, the sensor comprising;
 a pair of axially flexible elastic disks, each disk having a pair of axially opposite sides;

a body supporting said disks peripherally in fluid pressure sealed relation to the body with said disks disposed in coaxial and axially spaced relation so that the sensor has a pair of outward said sides corresponding individually to each of said disks and facing away from the other of said disks and has a pair of inward said sides corresponding individually to each of said disks and facing toward the other of said disks, said body having a first region peripherally and detachably engagable with one of said inward sides and having a second region peripherally and detachably engagable with the other of said inward sides;

a mass extending between said disks and having a pair of opposite portions spaced axially thereof, said opposite portions being individually connected to said disks so that momentum of said mass causes axial flexing of said disks in the same direction during said acceleration and displacement, said mass being one mass of a plurality of different masses each having a pair of said opposite portions and each opposite portion of said pair thereof of each of said masses being detachably engagable with the inward side of the disk corresponding to the opposite portion;

means for releasably connecting each of said disks to the corresponding one of said portions of said masses, for releasably maintaining said first region and said second region in said pressure sealed relation, and for separating said disks from said mass and from said body to replace said one mass with another mass of said plurality thereof; and means for providing an output signal corresponding to said flexing of said disks to detect said acceleration and said displacement.

* * * * *